United States Patent
Chung et al.

(10) Patent No.: US 10,838,597 B2
(45) Date of Patent: Nov. 17, 2020

(54) PROCESSING OBJECTS ON TOUCH SCREEN DEVICES

(71) Applicant: INTERNATIONAL BUSINESS MACHINES CORPORATION, Armonk, NY (US)

(72) Inventors: Chun-Sheng Chung, Taipei (TW); Ping-Hung Lai, Taipei (TW); Yu-Chun Lin, Taipei (TW); Ting-Yi Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/678,166

(22) Filed: Aug. 16, 2017

(65) Prior Publication Data
US 2019/0056850 A1    Feb. 21, 2019

(51) Int. Cl.
*G06F 3/0484* (2013.01)
*G06F 3/0488* (2013.01)
*G06F 40/103* (2020.01)

(52) U.S. Cl.
CPC ........ *G06F 3/04842* (2013.01); *G06F 3/0488* (2013.01); *G06F 3/04845* (2013.01); *G06F 3/04886* (2013.01); *G06F 40/103* (2020.01); *G06F 2203/04806* (2013.01)

(58) Field of Classification Search
CPC .................................................. G06F 3/04842
See application file for complete search history.

(56) References Cited

U.S. PATENT DOCUMENTS

| | | | | |
|---|---|---|---|---|
| 5,479,596 A | * | 12/1995 | Capps | G06F 17/25 345/156 |
| 5,832,528 A | * | 11/1998 | Kwatinetz | G06F 3/04842 715/272 |
| 9,134,893 B2 | | 9/2015 | Hicks | |
| 9,424,249 B1 | * | 8/2016 | Grigsby | G06F 17/2785 |
| 2004/0240735 A1 | * | 12/2004 | Medina | G06K 9/00456 382/173 |
| 2011/0202835 A1 | | 8/2011 | Jakobsson et al. | |

(Continued)

FOREIGN PATENT DOCUMENTS

CN        103941973 A        7/2014

OTHER PUBLICATIONS

Screen captures from YouTube video clip entitled "How-to AverageIf Excluding Zeros and Blanks for Non Contiguous Ranges in Excel," 8 pages, uploaded Jan. 12, 2015 by user "Excel Dashboard Templates." Retrieved from internet: https://www.youtube.com/watch?v=9DIu2sL1Bis (Year: 2015).*

(Continued)

*Primary Examiner* — Amy Ng
*Assistant Examiner* — Samuel Shen
(74) *Attorney, Agent, or Firm* — Jordan T. Schiller (57) ABSTRACT

A computer-implemented method for processing objects on touch screen devices is proposed. According to the method, one or more grid sizes is determined, wherein the one or more grid sizes comprise one or more text grid sizes. The one or more text grid sizes are determined by at least one of character, word, sentence, and section. Based on the one or more grid sizes, the one or more objects on the touch screen could be divided into one or more grids. The objects on the screen could be selected discontinuously by selecting grids on the screen.

10 Claims, 5 Drawing Sheets

(56) References Cited

U.S. PATENT DOCUMENTS

| | | | |
|---|---|---|---|
| 2011/0320978 A1* | 12/2011 | Horodezky | G06F 3/0488 |
| | | | 715/823 |
| 2012/0102401 A1* | 4/2012 | Ijas | G06F 3/04883 |
| | | | 715/702 |
| 2012/0306772 A1* | 12/2012 | Tan | G06F 3/0488 |
| | | | 345/173 |
| 2012/0311437 A1* | 12/2012 | Weeldreyer | G06F 3/0485 |
| | | | 715/252 |
| 2013/0227490 A1 | 8/2013 | Thorsander et al. | |
| 2013/0290906 A1* | 10/2013 | Thorsander | G06F 3/04842 |
| | | | 715/835 |
| 2014/0068509 A1 | 3/2014 | Kadishay et al. | |
| 2014/0248948 A1 | 9/2014 | Ho et al. | |
| 2015/0052430 A1* | 2/2015 | Dwan | G06F 3/0482 |
| | | | 715/702 |
| 2015/0074606 A1* | 3/2015 | Melen | G06F 3/04817 |
| | | | 715/835 |

OTHER PUBLICATIONS

IBM: List of IBM Patents or Patent Applications Treated as Related (Appendix P), Nov. 21, 2017, pp. 1-2.

Hung et al., Pending U.S. Appl. No. 15/818,786, filed Nov. 21, 2017, titled "Processing Objects on Touch Screen Devices,", pp. 1-25.

Roth et al, "Bezel Swipe: Conflict-Free Scrolling and Multiple Selection on Mobile Touch Scree Devices," http://www.volkerroth.com/proj-bezelswipe.html, In Proc. CHI, 2009, Printed on Aug. 7, 2017, pp. 1-2.

Google, "Google Translate," by Google, Inc., https://itunes.apple.com/tw/app/google-translate/id414706506?mt=8, Printed on Aug. 7, 2017, pp. 1-2.

* cited by examiner

PROCESSING OBJECTS ON TOUCH SCREEN DEVICES

BACKGROUND

The present disclosure relates to data processing, and more specifically, to processing objects on touch screen devices.

Nowadays, with the developing of information technology, touch screen devices, especially touch screen mobile phones, are widely used. However, due to limitations of screen size and original design of operation, etc., it is hard for users to perform complex operations on touch screen devices, and this brings great inconvenience to the users.

SUMMARY

This Summary is provided to introduce objects processing on touch screen devices that are further described herein in the Detailed Description. This Summary is not intended to identify key factors or essential features of the claimed subject matter, nor is it intended to be used to limit the scope of the claimed subject matter.

According to one embodiment of the present invention, there is provided a computer-implemented method. According to the method, one or more grid sizes are determined, wherein the one or more grid sizes comprise one or more text grid sizes, wherein the one or more text grid sizes are determined by at least one of character, word, sentence, and section. One or more objects on a screen are divided into one or more grids at least based on the one or more grid sizes.

According to another embodiment of the present invention, there is provided a system. The system includes one or more processors and a memory coupled to at least one of the processors. A set of computer program instructions are stored in the memory and executed by at least one of the processors in order to perform actions. The actions include determining one or more grid sizes, wherein the one or more grid sizes comprise one or more text grid sizes, wherein the one or more text grid sizes are determined by at least one of character, word, sentence, and section. The system divides one or more objects on a screen into one or more grids based on at least the one or more grid sizes.

According to yet another embodiment of the present disclosure, there is provided a computer program product. The computer program product is tangibly stored on a non-transient machine readable medium and comprising executable instructions which, when executed on a device, cause the device to determine one or more grid sizes, wherein the one or more grid sizes comprise one or more text grid sizes, wherein the one or more text grid sizes are determined by at least one of character, word, sentence, and section. The executable instructions of the computer program product divide one or more objects on a screen into one or more grids based on at least the one or more grid sizes.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various ways, and thus should not be construed to be limited to the embodiments disclosed herein.

Figure 1:
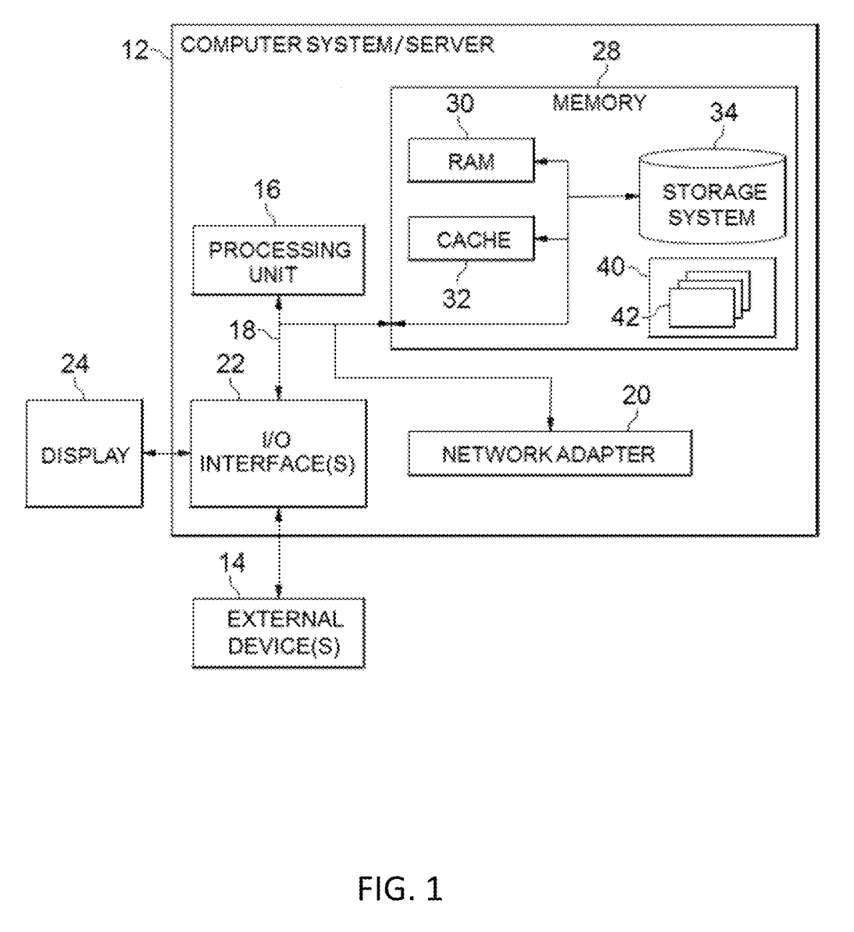
FIG. 1 shows an exemplary computer system which is applicable to implement the embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Conventionally, as mentioned above, the development of information technology changes people's lives in many aspects, and the wide usage of touch screen devices, especially touch screen mobile phones, is a significant aspect. Undoubtedly, touch screen devices bring great convenience to users. However, there are still some limitations. For example, due to the limitation of screen sizes and original designs of operations, it is hard for users to select objects on the screens of the touch screen devices. It is especially hard to locate and select the objects accurately. Furthermore, it is not possible to select the objects discontinuously distributed on the screens.

In order to at least in part solve the above mentioned and other potential problems, according to embodiments of the present disclosure, a new approach for easily selecting multiple sections discontinuously distributed with more flexibility is proposed.

Some definitions are provided for better understanding of this invention. Hereinafter, "grid" refers to a minimum selectable unit on a screen. Accordingly, "text grid" refers to a minimum selectable unit of text, and "figure grid" refers to a minimum selectable unit of figure. "Text grid size" refers to a size of the text grid, such as character/word/sentence/section. "Figure grid size" refers to a size of the figure grid, such as a whole figure. "Object" refers to a selectable content on the screen. "Object unit" refers to all object(s) within a grid. "Predefined text size" refers to a predefined font size used for determining the text grid size. "Visual text size" refers to a presentation font size of a text.

Figure 2:
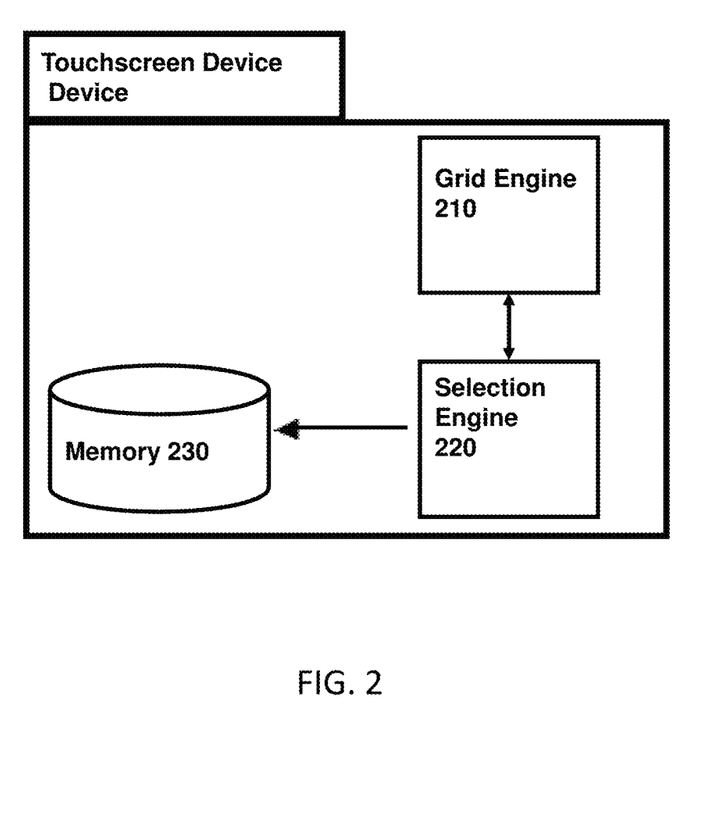
FIG. 2 is a schematic diagram of a data processing system in accordance with embodiments of the present invention.

FIG. 2 shows a schematic diagram of an object processing system 200 in accordance with embodiments of the present disclosure. The object processing system 200 may include a grid engine 210, a selection engine 220, and a memory 230. The grid engine 210 may detect the area being touched in the screen and divide objects on the screen into one or more text grids and/or one or more figure grids. The grid engine 210 may be initiated in a number of ways, subject to the design of the operation system, and a user's usage habit, etc.

In one embodiment, the grid engine 210 can be initiated when a user activates the object processing system 200, for example, by double clicking on the screen. Alternatively, the grid engine 210 can be initiated automatically when a related software/application is loaded. After being initiated, the grid engine 210 may determine a grid size. In one embodiment, the grid size is defined by a user directly. In another embodiment, the grid size could be defined based on the user's usage habit, historical data of grid size setting, etc.

In a further embodiment, a predefined text size is determined first to determine the text grid size. In one embodiment, the predefined text size could be defined by the user directly. In another embodiment, the predefined text size could be determined by the object processing system 200. For example, the grid engine 210 detects the text area being touched, and the font size of the touched area would be recognized accordingly. The font size could be recognized as the font size defined by applications, such as Points defined in Microsoft® Word, etc. It would be highly appreciated to understand that different applications or touch screen devices would have their own preferential font size unit. These font size units could be converted according to a font size unit conversion formula. For the purpose of explanation, font size "percent", which is frequently used as a font size unit, may hereinafter be used to illustrate this invention.

In one embodiment, the predefined text size might be the maximum font size within the touched text area multiplied by a screen display scale. For example, if the maximum font size within the touched text area is 50%, and the screen display scale is 100%, then the predefined text size can be 50%*100%=50%. It is to be understood that the predefined text size could be set as other size(s), such as minimum font size, or main font size on a page. In such a scenario, the text grid size may be determined, at least, based on the visual text size and the predefined text size. The visual text size may be an actual font size multiplied by the screen display scale. For example, if the actual font size is 50%, and the screen display scale is 200%, then the visual text size could be 50%*200%=100%.

The text grid size could be determined based on the comparison of visual text size and predefined text size. For example, if the visual text size is less than the predefined text size, the text grid size would be a sentence; if the visual text size is equal to the predefined text size, the text grid size would be a word; and if the visual text size is larger than the predefined text size, the text grid size would be a character. Those skilled in the art would readily appreciate that the text grid size could be determined based on other rules. In another embodiment, if a text is in an analphabetic writing, such as Chinese, the text grid size could be a sentence, a word group, or a word, accordingly. Any suitable technology, either currently known or to be developed, can be applied for setting the text grid size. Those skilled in the art may adjust the setting of grid size, and this would not exceed the scope of this invention.

Figure 4A:
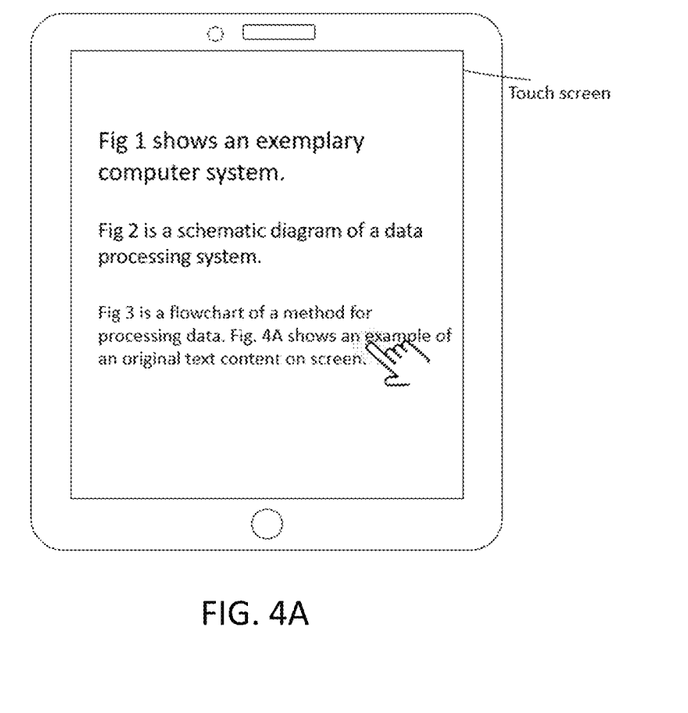
FIG. 4A shows an example of an original text content on a screen in accordance with embodiments of the present invention.

FIG. 4A shows an example of an original text content on screen in accordance with embodiments of the present disclosure. There are three paragraphs of text shown on the screen. After the grid engine 210 is initiated, the text contents, shown on FIG. 4A, could be processed.

The grid engine 210 detects the text area being touched, and then determines a maximum font size of the text within the text area being touched. For example, the touching area includes two characters/words with one character/word font size being 50% and the other character/word size being 40%. In this case, the maximum font size is 50%, and the display scale is 100%. Therefore, the predefined text size would be 50%*100%=50%. In the first paragraph, the visual text size is 60%, so the visual text size is larger than the predefined text size, and the text grid size would be a character. In the second paragraph, the visual text size is 50% which is equal to the predefined text size. Therefore, the text grid size of the second paragraph would be a word. In the last paragraph, the visual text size is 40% which is smaller than the predefined text size. Therefore, the text grid size of the last paragraph would be a sentence. As such, the whole content on the screen is divided into multiple grids, as shown on FIG. 4B.

Figure 4B:
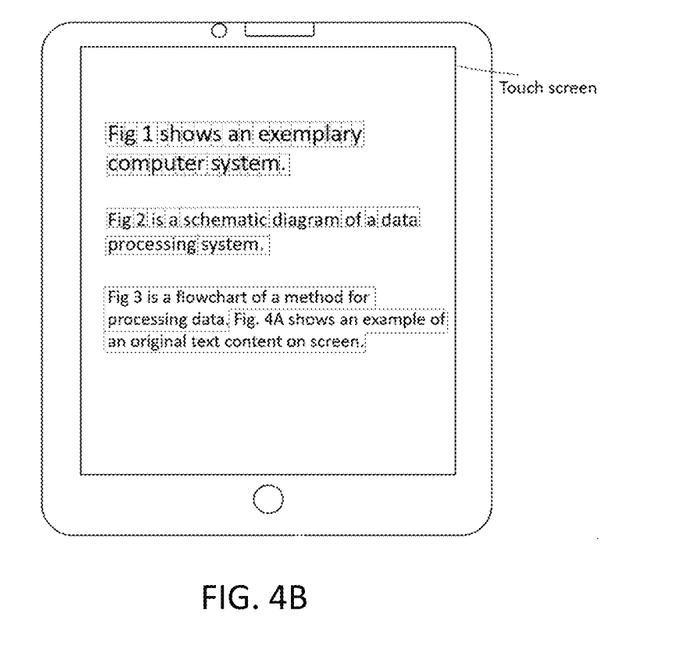
FIG. 4B shows an example of a text content with grids on a screen in accordance with embodiments of the present invention.
Figure 4C:
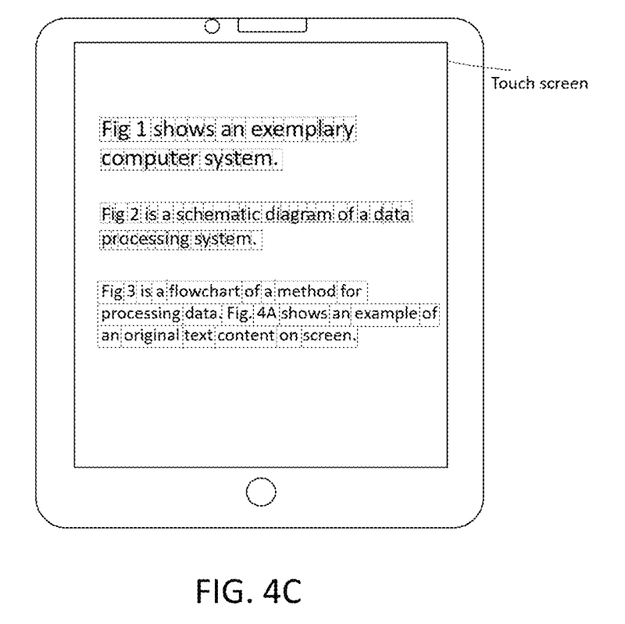
FIG. 4C shows another example of a text content with grids on a screen in accordance with embodiments of the present invention.

However, a user would need to adjust the text grid size. In one embodiment, the text grid size could be adjusted by zooming in/out the text. Referring now to FIG. 4C, by zooming-in the content on the screen, if the visual text size of the second paragraph would be larger than the predefined text size, then the text grid size of the second paragraph would be a character too. Also, if the visual text size of the last paragraph would be equal to the predefined text size, then the text grid size of the last paragraph would be a word.

Figure 4D:
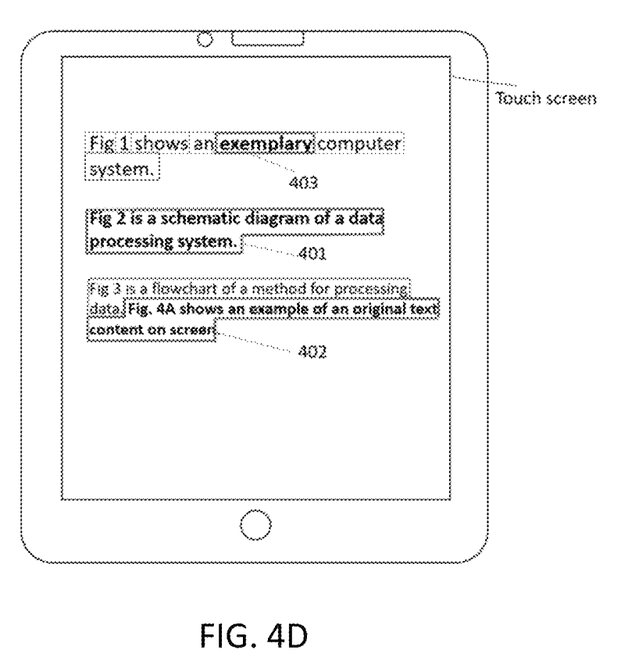
FIG. 4D shows a further example of a text content with grids on a screen in accordance with embodiments of the present invention.

Referring now to FIG. 4D, by zooming-out the content on the screen, if the visual text size of the first paragraph would be equal to the predefined text size, then the text grid size of the first paragraph would be a word. If the visual text size of the second and last paragraph would be smaller than the predefined text size, then the text grid size of the last two paragraphs would be a sentence. In this fashion, the user could adjust the text grid size easily and flexibly.

In a further embodiment, a figure grid size would be determined by the grid engine 210. In one embodiment, the figure grid size is a size of a whole figure. In another example, the figure could be divided into several figure grids. Any suitable technology, either currently known or to be developed, can be applied to divide the whole figure into several parts. By this way, one or more parts of the figure could be selected. In the event a figure comprises a text content, the text content could be recognized using text recognition technology, such as optical character recognition (OCR) technology, then the text grid could be determined using the method described above.

Now referring back to FIG. 2, after determining the grid size for all contents on the screen, the selection engine 220 would receive selection instructions. A user could select one or more objects for further operation by selecting one or more grids. The user could select a whole object unit in a grid by selecting the grid. For example, if one sentence within a grid is to be selected, then the user may successfully select the whole sentence by only clicking once on the grid. In a further embodiment, the selection could be discontinuous, which means the user could select the objects located in discontinuous grids. In this way, the selection could be very flexible.

Now referring back to FIG. 4D, three non-continuous grids are selected, and the selection would be stored in the Memory 230. Contents within these three non-continuous grids could be further processed, such as the contents could be pasted to another place. In one embodiment, the pasting order could be the order in which these three object units present in the original text. In another embodiment, the pasting order could be the order in which these three non-continuous grids were selected. Alternatively, the pasting order could be determined by the user directly. In this way, a more flexible method for operating the selected object units is provided.

In a further embodiment, the grid size could be further adjusted or changed after selecting one or more object units. In one embodiment, after selecting three grids (e.g. 401, 402 and 403 in FIG. 4D), the visual text size could be further adjusted by zooming in or zooming out the contents on the screen. The user could adjust the text grid size again, in this way, and select another one or more grids. For example, if after selecting object units 401 and 402, the user wants to further select a sentence in the first paragraph, then user could zoom out to change the text grid size of the first paragraph to sentence, and a sentence in the first paragraph could be easily selected. In this way, a more flexible method for selecting contents on the screen is provided.

Figure 3:
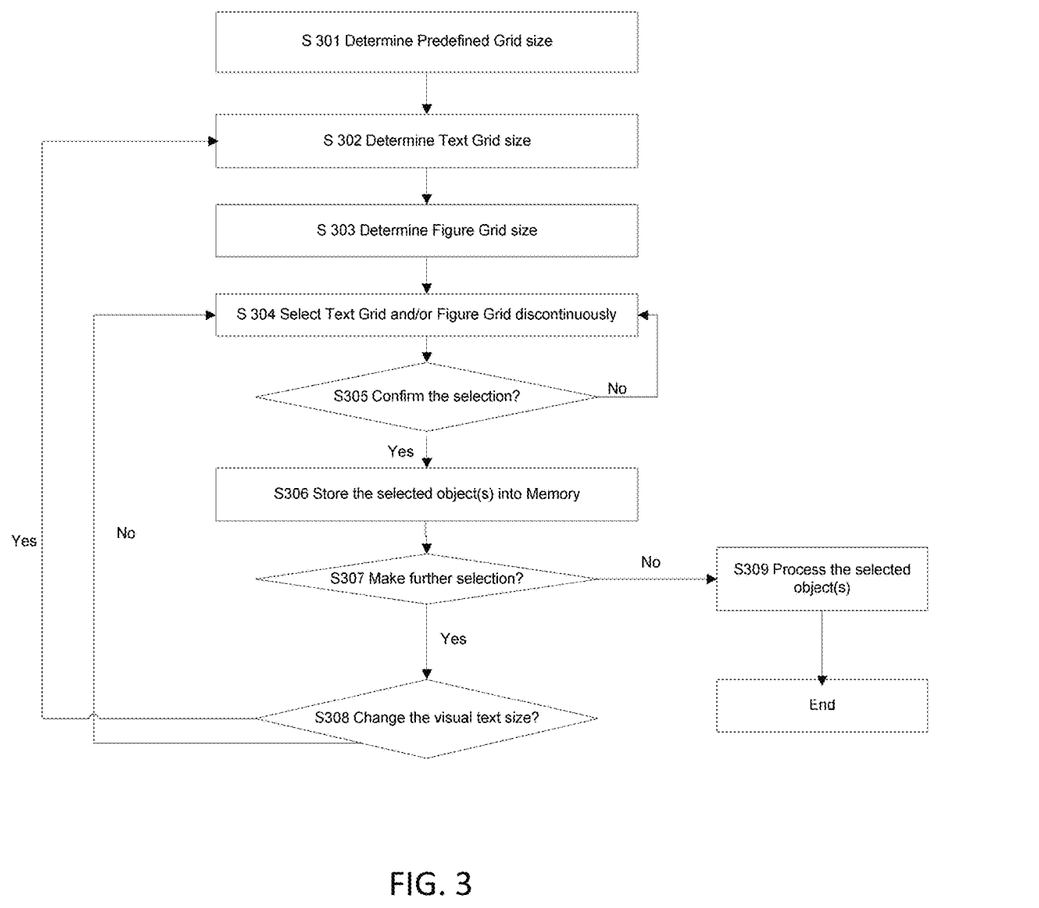
FIG. 3 is a flowchart of a method for processing data in accordance with embodiments of the present invention.

FIG. 3 is a flowchart of a method for processing one or more objects in accordance with embodiments of the present disclosure. The method starts at S301, wherein the grid engine 210 may determine a predefined text size. In one embodiment, the predefined text size is defined by a user directly. In another embodiment, the predefined text size is determined by the system based on a previous predefined text size and a machine learning technology. Alternatively, the predefined text size is determined based on a font size on the screen. In one embodiment, the grid engine 210 may detect an area being touched when a user touches the screen, then the font size of the touched area would be recognized, wherein the font size could be the font size defined by applications, such as Points defined by Microsoft® Word, etc. In a further embodiment, the predefined text size could be the visual size of the text, which is the font size multiplied by screen display scale. In a further embodiment, the predefined text size could be the maximum visual text size among the text being touched. For example, if the maximum font size is 50%, and the screen display scale is 100%, then the predefined text size is 50%*100%=50%. In another example, if the maximum font size among touched area is 50%, and the screen display scale is 120%, then the maximum visual text size is 50%*120%=60%. As such, the predefined text size would be 60% here. It is to be understood that the predefined text size could be set as others size, such as the minimum font size, or the main font size among the touched text area.

The method moves to Step S302, wherein the text grid size might be determined, at least, based on the visual text size and the predefined text size. The visual text size could be the actual font size multiplied by the screen display scale. The text grid size could be determined at least based on the comparison of the visual text size and the predefined text size. For example, if the visual size of text is less than the predefined text size, the text grid size would be sentence; if the visual size of text is equal to the predefined text size, the text grid size would be word; and if the visual size of text is larger than the predefined text size, the text grid size would be character. Furthermore, if a whole section needs to be set as text grid size, then a special gesture, for example, zooming out the text at the minimum scale status, could be used to set a section as a text grid size. In another embodiment, for the analphabetic writing such as Chinese, the word group recognition technology could be used to identify each word group in the screen. In this way, the text grid size could be set as word group as well. Those skilled in the art would readily appreciate that the text grid size could be determined based on other rules, and this would not exceed the scope of this invention.

Now referring to FIG. 4A, a further illustration may be provided. FIG. 4A shows an example of an original text content on a screen, in accordance with embodiments of the present disclosure. Three text paragraphs are shown on the screen. After grid engine 210 is initiated, the text content in FIG. 4A could be processed.

The grid engine 210 detects a text area being touched, and then determines the maximum font size of the text area being touched. For example, the touched area includes two characters: one character size being 50% and the other character size being 40%. In this case, the maximum font size is 50%, and the display scale is 100%, so the predefined text size would be 50%*100%=50%. In the first paragraph, the visual text size is 60% which is larger than the predefined text size. Therefore, the text grid size would be character. In the second paragraph, the visual text size is 50% which is equal to the predefined text size. Therefore, the text grid size of the second paragraph would be word. In the last paragraph, the visual text size is 40%, which is smaller than the predefined text size. Therefore, the text grid size of the last paragraph would be sentence. As such, all contents on the screen are divided into multiple grids as shown in FIG. 4B.

In another embodiment, if a user would need to adjust or change the text grid size, the text grid size could be changed by zooming in/out the text on the screen, so that the relationship of visual text size and predefined text size would be changed accordingly. Now referring to FIG. 4C, by zooming in the text on the screen, the visual text size of the second paragraph would be larger than the predefined text size, then the text grid size of the second paragraph would be character too, and the visual text size of the last paragraph would be equal to the predefined text size, then the text grid size of the last paragraph would be changed to word accordingly. Referring to FIG. 4D, by zooming out the text on the screen, the visual text size of the first paragraph would be equal to the predefined text size, then the text grid size of the first paragraph would be changed to word, and the visual text size of the second and last paragraph would be smaller than the predefined text size, so the text grid size of the last two paragraphs would be sentence. In this way, the user could adjust the grid size easily and flexibly.

Now referring back to FIG. 3, if there is a figure that needs to be selected, the method would go forward to S303 to determine a figure grid. In one embodiment, the figure grid could be a whole figure, which means a figure would be determined as an object unit to be put in the figure grid. In another embodiment, the figure grid could be a part of figure. In some embodiments, there is text(s) in the figure(s) which also needs to be processed. The text could be recognized by using any figure recognition technology, such as OCR technology. In this fashion, the text grid size of the text(s) in the figure(s) could be determined just like the text in the other part.

Although the step S303 shown in FIG. 3 is performed after the step S301, it is to be noted that the relationship of the sequence of the step S301/S302 and the step S303 are not limited thereto, but may be arbitrary. It is also possible to perform the step S303 prior to the step S301/S302. Without an explicit definition of order, the steps defined in claims should not be interpreted with limitation of any specific order. Although step 301/302 and step 303 are all shown in FIG. 3, however if there is only text or figure on the screen, those skilled in the art could understand that step 303 or step 301/302 would not be necessary, accordingly.

In step S304, wherein the text grid(s) and/or the figure grid(s) could be selected, a whole object unit within a grid could be selected by one time. For example, if the text grid is sentence, a whole sentence could be selected by clicking once on the grid, and the user does not need to locate the beginning and ending of the selection. In this way, it would be easier and faster to choose the object(s), and the text grid(s) and/or figure grid(s) could be selected discontinuously. As such the user could flexibly select what s/he wants.

After confirming the selection in step S305, the selection could be stored in Memory 230 in step 306. In a further embodiment, the selection order could be stored in Memory 230 too. For example, the selection order as shown in FIG. 4D would be stored in Memory 230 with the three object units too.

Then the method goes to step S307, wherein whether a further selection needs to be made is determined, and if the further selection needs not to be made, the method goes to step S309 directly. If the further selection needs to be made, the method goes to step S308 to further determine if zooming in or zooming out is to be performed to change the visual text size of the text. If zooming in or zooming out is to be performed, the method goes back to S302, wherein a new text grid size would be determined. In this way, after saving the previous selection, the text grid size could be redefined to make selection of the text more flexibly. For example, after selecting three object units, the user decides to select the whole section of the last paragraph, then user could zoom out the screen at the minimum status to change the text grid size as section, then user could select the whole content of the last paragraph by clicking the grid once after selecting three object units. In this way, the selection of the content would be very flexible, and if zoom in or zoom out is not to be performed to change the visual text size of text, then the method goes back to S304, wherein the user could just make a further selection without changing the text grid size.

After step S307, if no more selection is needed, the method goes to step S309. After all selections are made, the selected object units could be further processed as needed, for example they could be pasted into another document/application/software. In one embodiment, the order of the pasting could be the selected object units' presentation order in the screen. Alternatively, the order of the pasting could be the order of selecting. As another alternative, the order of the pasting could be determined by the user. In this way, the user could select and process the selected content easily and flexibly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
   a processor;
   a computer-readable memory coupled to the processor, the memory comprising instructions that when executed by the processor perform actions of:
   determining one or more grid sizes, on a touchscreen, wherein the one or more grid sizes comprise one or more text grid sizes, wherein the one or more text grid sizes are based on text size display and page zoom percentage, and wherein determining the one or more grid sizes further comprises:
  determining a predefined text size;
  determining one or more visual text sizes; and
  determining the one or more text grid sizes based on a comparison of at least the predefined text size and the one or more visual text sizes,
    wherein when the visual text size is less than the predefined text size, the text grid size encompasses a sentence;
    wherein when the visual text size is equal to the predefined text size, the text grid size encompasses a word; and
    wherein when the visual text size is larger than the predefined text size, the text grid size encompasses a character;
  dividing one or more objects on a screen into one or more grids based on at least the one or more text grid sizes;
  detecting a text area being touched in the one or more text grid sizes;
  determining a maximum font size of text within the text area being touched, wherein the maximum font size of text is based on the text size display and the page zoom percentage;
  adjusting the one or more text grid sizes based on the text area being touched;
  selecting entire contents of the one or more text grid sizes by a single touch;
  selecting one or more objects, by one or more touches, that are discontinuously distributed on the screen, wherein the one or more objects units comprise all objects within the one or more grids; and
  storing the selected one or more objects, and its respective sequence, in memory for further operation.

2. The computer system of claim 1, wherein the actions further comprise:
  determining one or more changed text grid sizes.

3. The computer system of claim 2, wherein determining one or more changed text grid sizes further comprises:
  determining one or more changed visual text sizes; and
  determining the one or more changed text grid sizes based on a comparison of at least the one or more changed visual text sizes and a predefined text size.

4. The computer system of claim 1, wherein determining the one or more grid sizes further comprises:
  determining one or more figure grid sizes;
  recognizing one or more texts in one or more figures associated with the one or more figure grid sizes; and
  determining the one or more text grid sizes of the one or more texts in the one or more figures.

5. The computer system of claim 1, further comprising:
  processing the selected one or more object units, that are discontinuously distributed and selected on the screen, according to an order of selecting the one or more object units.

6. A computer program product, comprising a computer readable storage medium having program instructions embodied therewith, the program instructions executable by a processor to cause the processor to:
  determine one or more grid sizes, on a touchscreen, wherein the one or more grid sizes comprise one or more text grid sizes, wherein the one or more text grid sizes are based on text size display and page zoom percentage, and wherein determining the one or more grid sizes further comprises:
    determining a predefined text size;
    determining one or more visual text sizes; and
    determining the one or more text grid sizes based on a comparison of at least the predefined text size and the one or more visual text sizes,
      wherein when the visual text size is less than the predefined text size, the text grid size encompasses a sentence;
      wherein when the visual text size is equal to the predefined text size, the text grid size encompasses a word; and
      wherein when the visual text size is larger than the predefined text size, the text grid size encompasses a character;
  divide one or more objects on a screen into one or more grids based on at least the one or more text grid sizes;
  detect a text area being touched in the one or more text grid sizes;
  determine a maximum font size of text within the text area being touched, wherein the maximum font size of text is based on the text size display and the page zoom percentage;
  adjust the one or more text grid sizes based on the text area being touched;
  select entire contents of the one or more text grid sizes by a single touch;
  select one or more objects, by one or more touches, that are discontinuously distributed on the screen, wherein the one or more objects comprise all objects within the one or more grids; and
  store the selected one or more objects, and its respective sequence, in memory for further operation.

7. The computer program product of claim 6, wherein the program instructions executable by the processor further cause the processor to:
  determine one or more changed text grid sizes.

8. The computer program product of claim 7, wherein the program instructions to determine one or more changed text grid sizes further comprise program instructions executable by the processor to cause the processor to:
  determine one or more changed visual text sizes; and
  determine the one or more changed text grid sizes based on a comparison of at least the one or more changed visual text sizes and a predefined text size.

9. The computer program product of claim 6, wherein the program instructions to determine the one or more grid sizes further comprise program instructions executable by the processor to cause the processor to:
  determine one or more figure grid sizes;
  recognize one or more texts in one or more figures associated with the one or more figure grid sizes; and
  determine the one or more text grid sizes of the one or more texts in the one or more figures.

10. The computer program product of claim 6, wherein the program instructions executable by a processor further cause the processor to:
  process the selected one or more object units, that are discontinuously distributed and selected on the screen, according to an order of selecting the one or more object units.

* * * * *